United States Patent [19]

Weberndoerfer et al.

[11] Patent Number: 4,560,745

[45] Date of Patent: Dec. 24, 1985

[54] PREPARATION OF DYES WHICH CONTAIN SULFONIC ACID GROUPS AND HAVE A LOW ELECTROLYTE CONTENT

[75] Inventors: Volkmar Weberndoerfer, Mannheim; Friedrich Brunnmueller, Ludwigshafen; Manfred Eisert, Ludwigshafen; Rudolf Bermes, Ludwigshafen, all of Fed. Rep. of Germany

[73] Assignee: BASF Aktiengesellschaft, Ludwigshafen, Fed. Rep. of Germany

[21] Appl. No.: 263,007

[22] Filed: May 12, 1981

[30] Foreign Application Priority Data

Dec. 2, 1980 [DE] Fed. Rep. of Germany ....... 3045377

[51] Int. Cl.$^4$ .................. C09B 69/02; C09B 69/04; C09B 67/42; C09B 67/44
[52] U.S. Cl. .................. 534/728; 106/288 Q; 106/308 Q; 106/309; 260/245.78; 260/372; 260/505 R; 534/689; 534/887; 544/209; 544/210; 544/219; 546/101
[58] Field of Search .................. 260/208, 372, 505 R, 260/245, 78; 534/728, 689, 887; 544/209, 210, 219; 106/288 Q, 308 Q, 309; 546/101

[56] References Cited

U.S. PATENT DOCUMENTS

| 3,719,703 | 3/1973 | Fritz et al. ................ 260/505 N |
| 3,956,271 | 5/1976 | Blass et al. ................ 260/208 |
| 4,110,366 | 8/1978 | Tamabayashi et al. ........ 260/505 P |
| 4,163,012 | 7/1979 | Kramer et al. ............. 260/208 X |
| 4,290,812 | 9/1981 | Loock ..................... 260/208 X |

FOREIGN PATENT DOCUMENTS 0021619 1/1981 European Pat. Off. ............ 260/208
2158059 11/1971 Fed. Rep. of Germany ...... 260/208
2132680 11/1972 France ......................... 260/208

OTHER PUBLICATIONS

Article by Otakar Cerny and Josef Hajek, 10-11-78, pp. 410–413.
Chemical Abstracts, vol. 86, No. 26, p. 27, Jun. 1977, (Taoka Chem.).
Analytica Chimica Acta, vol. 113, No. 2, 1980, pp. 307–314, (Puttemans et al).

*Primary Examiner*—Floyd D. Higel
*Attorney, Agent, or Firm*—Oblon, Fisher, Spivak, McClelland & Maier

[57] ABSTRACT

A process for the preparation of dyes which contain sulfonic acid groups and have a low electrolyte content, wherein an aqueous solution or suspension, which may or may not contain inorganic salts, of the dye containing sulfonic acid groups is (a) mixed with an amount, equivalent to the said dye, of a non-emulsifying, water-insoluble amine of a total of 12 to 40 carbon atoms, which forms, with the said dye, a salt which is sufficiently lipophilic for it to separate spontaneously from the aqueous phase, (b) the pH is brought to <5 with an acid and the batch is mixed thoroughly, (c) the two resulting phases of different density are separated, and (d) the phase which consists of the lipophilic ammonium salt of the dye is mixed, with or without prior washing with water, with a water-soluble base whose sulfonate salt is to be prepared, and with water, the resulting phases are separated, and the salt is left in the aqueous solution or is isolated therefrom.

5 Claims, No Drawings

PREPARATION OF DYES WHICH CONTAIN SULFONIC ACID GROUPS AND HAVE A LOW ELECTROLYTE CONTENT

The present invention relates to a process for the preparation of dyes which contain sulfonic acid groups and have a low electrolyte content, wherein an aqueous solution or suspension, which may or may not contain inorganic salts, of the dye containing sulfonic acid groups is (a) mixed, at elevated temperature, with an amount, equivalent to the said dye, of a non-emulsifying, water-insoluble amine of a total of 12 to 40 carbon atoms, which forms, with the said dye, a salt which is sufficiently lipophilic that it separates spontaneously from the aqueous phase, (b) the pH is brought to <5 with an acid and the batch is mixed thoroughly, (c) the two resulting phases of different density are separated, and (d) the phase which consists of the lipophilic ammonium salt of the dye is mixed, with or without prior washing with water, with a water-soluble base whose sulfonate salt is to be prepared, and with water, the resulting phases are separated, and the salt is left in the aqueous solution or is isolated therefrom.

Accordingly, the novel process may be used to separate the dyes, containing sulfonic acid groups, from acids and, where relevant, salts, especially from the acids and salts which are present, or are formed, in the synthesis of the dyes containing sulfonic acid groups.

It was very surprising that it proved possible to provide, in the process according to the invention, a simple, economical and environmentally acceptable method suitable for industrial operation.

It is especially surprising that stoichiometric amounts of water-insoluble amines will bond, at elevated temperature, with high selectivity, only the dye, containing sulfonic acid groups, present in a mixture which contains acids and may or may not contain salts, without the amine exerting an emulsifying action, and that the resulting salt, which is preferably liquid, separates from the aqueous phase. The only auxiliary which the novel process requires is the amine and the latter is regenerated and accordingly neither pollutes the environment nor adds to the costs.

The process according to the invention is carried out, for example, as follows:

An amount of a water-insoluble amine stoichiometrically equivalent to the sulfo groups of the dye is added to a solution or suspension of the dye containing sulfonic acid groups at elevated temperature. The pH is then brought to <5, preferably <3, with an acid.

After thorough mixing, two phases form, namely an aqueous phase and a phase which contains the salt of the organic amine with the dye containing sulfonic acid groups, and has a low content of extraneous salts. The aqueous phase is separated off. The organic phase is advantageously washed with water, if necessary repeatedly, in order to remove residual inorganic compounds.

It is subsequently easily possible to liberate the amine again from the organic phase by adding an equivalent or larger amount (25% excess) of a water-soluble amine whose sulfonate salt is to be prepared, and also adding water. By proceeding in this way, a concentrated aqueous solution of the desired dye salt is obtained, and the water-insoluble amine is recovered. The latter can be re-used. The wash waters can also be re-used in the next working-up cycle. Of course, other bases such as alkali metal hydroxides can also be used in place of water-soluble amines.

Suitable water-insoluble amines which do not have an emulsifying action, and which form, with the dye containing sulfonic acid groups, a liquid salt which is sufficiently lipophilic that it separates spontaneously from the aqueous phase, are water-insoluble homocyclic and heterocyclic aliphatic, aromatic, araliphatic and, preferably, open-chain, branched or unbranched, aliphatic amines of a total of 12 to 40, preferably 16 to 36, carbon atoms, the use of tertiary and secondary amines being preferred. Examples of such amines include tri-n-octylamine, tri-2-ethylhexylamine, tribenzylamine, methyldioctylamine, methyldidecylamine, tridodecylamine, tributylamine, di-2-ethylhexylamine, didecylamine and N,N-dibutylaniline. Most primary amines of 12 to 40 carbon atoms are rather less suitable, because they have an emulsifying action. However, primary amines of the structural formula

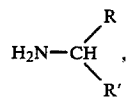

where R and R' together contain 11 to 39 carbon atoms and have comparable chain lengths can be used.

Suitable bases for transferring the sulfonic acid from the organic phase back into the aqueous phase and at the same time converting the sulfonic acid into the water-soluble salt (which in most cases is the desired end product) are, in particular, water-soluble, aliphatic amines which do not have an emulsifying action, and especially alkanolamines. Examples of such amines are methylamine, ethylamine, propylamine, butylamine and preferably 2-hydroxyethylamine (ie. ethanolamine) and 2-hydroxypropylamine, and the corresponding amines wherein (except in the case of ethyl, propyl and butyl) one, two or three of the substituents, which may be identical or different, are present; this means that the primary, secondary or tertiary amines may be used, except that triethylamine and its higher homologs are normally insufficiently water-soluble (though monoamylamine is still sufficiently water-soluble to be used). In spite of their comparatively low basicity, alkanolamines are particularly suitable for transferring sulfonates into the aqueous phase.

Where, in the case of the amines and their sulfonates, reference is made to the solubility or insolubility in water, or to sufficient lipophilic character to ensure separation from the aqueous phase, it means, for the purposes of the present invention, adequate solubility or insolubility or separability for industrial purposes. Losses or contaminations of a few percent, attributable to less than 100% insolubility, can at times be tolerated or be minimized by repeating the separating operation.

The process according to the invention is carried out at elevated temperature, i.e., approximately from 50° to 130° C., preferably from 60° to 105° C., and can readily be adapted to the circumstances of any specific problem. If the organic phase is viscous, it is advisable to carry out the process at a relatively high temperature in order to reduce the time required for the phases to separate.

The amine of 12 to 40 carbon atoms should be employed in substantially exactly the stoichiometric amount relative to the sulfonic acid present, since an excess of amine carries acid into the organic phase if the amine is of more than 16 carbon atoms. If the dye contains more than one sulfo group, a slightly less than stoichiometric amount of amine can be used.

The water-soluble base can be employed in the stoichiometric amount or in an excess, for example of up to 25%; a less than stoichiometric amount would result in a poorer yield, whilst an excess only interferes if it is undesirable as an impurity in the end product.

The end products can either be left in aqueous solution or be isolated by conventional mechanical methods of phase separation, for example evaporating-down or crystallizing or decanting or filtering-off.

The novel process is exceptionally suitable for isolating dyes and optical brighteners, which contain sulfonic acid groups and which have been obtained, for example, by sulfonation, as well as for isolating dyes from reaction mixtures resulting, for example, from azo coupling or from a condensation reaction. Azo coupling reaction mixtures as a rule in any case contain acid and salt, but where necessary they must, like alkaline condensation mixtures, be brought to a pH of <5.

Examples of dyes and optical brighteners which contain sulfonic acid groups are dyes from the azo, stilbene-azo, stilbene-azoxy, anthraquinone and phthalocyanine series and optical brighteners from the bis-triazinyl-aminostilbenedisulfonic acid series, especially those of the formula

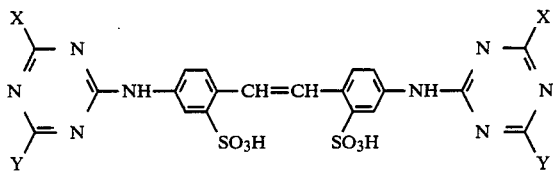

where X and Y are unsubstituted or substituted alkoxy or amino; large numbers of these compounds are described in the literature.

Given a suitable choice of the cation (which essentially determines the solubility), the lipophilic ammonium salt of the compound containing sulfonic acid groups, the salt having been isolated by separating off, can be converted to a very concentrated aqueous solution which is an excellent fluid dye formulation. This is industrially of particular importance in the case of dyes and optical brighteners which, in the usual presence of inorganic salts, give solutions of only low concentration and which accordingly cannot be converted to commercial fluid dye formulations. Fluid formulations of dyes containing sulfonic acid groups are required, for example, by the textile industry and especially by the paper industry, in order to avoid the disadvantages associated with dye powders.

Instead of preparing the dyes or optical brighteners containing sulfonic acid groups, it is, of course, also possible to employ the process according to the invention to prepare their intermediates, containing sulfonic acid groups, in a form having a low electrolyte content, and then to react the intermediates further, to give the dyes. This embodiment of the process is particularly relevant if no further electrolytes, ie. salts, are introduced into the mixture during the actual preparation of the dye.

In the Examples, parts and percentages are by weight.

EXAMPLE 1

70 parts of 4-nitrotoluene-2-sulfonic acid in the form of a 77% strength moist press cake, 400.0 parts of water and 102.0 parts of 50% strength sodium hydroxide solution are stirred for 5 hours at 55°–58° C. The reaction mixture is then cooled to room temperature, 186.0 parts of 50% strength sulfuric acid and 60.0 parts of tributylamine are added, and the batch is heated to 100° C. and stirred at this temperature for 15 minutes. When the stirrer is stopped, the fluid tributylammonium salt of the dye separates out as an upper phase. The lower, aqueous phase is drained off and discarded. After having added 200.0 parts of water and 42.0 parts of diethanolamine, the mixture is stirred for one hour at 60° C., and is then cooled. Two phases are again obtained, namely a lower phase of the fluid dye and, above this, colorless tributylamine. The fluid dye is drained off and neutralized with a small amount of sulfuric acid. 360 parts of a stable solution of C.I. Direct Yellow 11 are obtained. 54.0 parts of tributylamine are recovered.

EXAMPLE 2

Orange II diethanolamine salt; C.I. Acid Orange 7, C.I. 15,510

Diazotized sulfanilic acid is coupled with β-naphthol in a conventional manner to give a mixture which contains 16.4 parts of Orange II (calculated as free acid) in 150 parts of water, plus salts resulting from the synthesis. 11.9 parts of di-2-ethylhexylamine are added to this mixture and the pH is brought to 1.5 by adding sulfuric acid, whilst stirring thoroughly. After a further 10 minutes' stirring at 80°, the phases are allowed to separate out at the same temperature. They are then separated from one another, giving an almost colorless, aqueous upper phase, which is discarded, and a deeply colored, oily lower phase, which in the main consists of the amine salt of the dye-acid. The lower phase is treated with 6.6 parts of diethanolamine and 40 parts of water for 15 minutes at 80° C., thereby displacing the di-2-ethylhexylamine from the dye-salt; 11.6 parts of this amine (97.1% of the amount employed) are separated off as the upper phase. 61.7 parts of a lower phase are obtained, containing virtually all of the dye in the form of a 31.7% strength aqueous solution of its diethanolamine salt.

EXAMPLE 3

Orange RO monoethanolamine salt (C.I. Acid Orange 8), C.I. 15,575

Diazotized 1-amino-2-methyl-4-benzenesulfonic acid is coupled with β-naphtol in a conventional manner, to give a mixture which in addition to inorganic salts contains 34.2 parts of Orange RO (calculated as free sulfonic acid) in 140 parts of the aqueous mixture. 26.5 parts of methyl-di-2-ethylhexylamine are added, after which sufficient sulfuric acid is introduced, with thorough stirring at 80° C., to give a pH of 1.8. After stirring for a further 10 minutes, the mixture is left to stand until phase separation occurs. The upper aqueous phase, which is virtually devoid of dye, is discarded and the lower phase, which consists of the dye salt of methyl-di-2-ethylhexylamine, is washed with 100 parts of water at 80° C. and is then thoroughly stirred with 7.5 parts of monoethanolamine in 100 parts of water at 80° C., after which the mixture is kept at the same temperature until phase separation again occurs. This gives an upper phase (24.9 parts, 93.9% of theory) consisting of methyl-di-2-ethylhexylamine and a lower phase (146.1 parts) which contains virtually all of the dye, as a 27.5% strength aqueous solution.

EXAMPLE 4

Diazotized 4-amino-azobenzene-4'-sulfonic acid is coupled with I-acid in a conventional manner, to give a mixture which contains 13.2 parts of dye (calculated as free acid) in 210 parts of the aqueous mixture. 11.9 parts of di-2-ethylhexylamine are added. The pH is then brought to 3 by adding 30% strength sulfuric acid, with thorough stirring, and the phases are separated at 70° C. The aqueous phase is discarded and the organic phase is thoroughly mixed with 10.3 parts of triethanolamine in 60 parts of water. After phase separation at 30° C., an organic phase (11.7 parts of amine, ie. 98.3% of theory), which retains only a very faint color, and an aqueous solution (146 parts) of the triethanolammonium salt of the dye-acid are obtained.

EXAMPLE 5

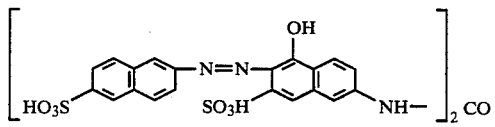

Monoethanolamine salt

Brönner acid is coupled with I-acid-urea in a conventional manner to give a mixture which contains 30.2 g of the above dye, 150 g of water, and inorganic salts resulting from the synthesis. The mixture is thoroughly mixed with 29.4 parts of di-2-ethylhexylamine at 60° C., the pH being brought to 2.5 with $H_2SO_4$. After phase separation, the aqueous phase is discarded and the organic phase is mixed thoroughly with 10.2 parts of monoethanolamine and 200 parts of water at 60° C. After renewed phase separation, an organic phase, consisting of the total amount of the di-2-ethylhexylamine, and an aqueous phase (248 parts), which contains a virtually quantitative yield of the monoethanolamine salt of the dye, are obtained.

EXAMPLE 6

116 parts of 4-nitrotoluene-2-sulfonic acid in the form of a moist 77% strength press cake, 840 parts of water and 330 parts of a 30% strength sodium hydroxide solution are heated for 2 hours at 75° C. A solution of 20 parts of 60% pure sodium sulfide in 110 parts of water is then added and the mixture is stirred for one hour at 75° C. 300 parts of 50% strength sulfuric acid, 30 parts of sodium sulfate and 100 parts of tributylamine are introduced, and the batch is stirred for 30 minutes at 100° C. and is then allowed to cool. The aqueous phase is decanted and the residue is washed with water. 400 parts of water and 70 parts of diethanolamine are then added and the mixture is heated for 30 minutes at 100° C. and again cooled. The fluid dye, which forms the lower phase, is drained off. The tributylamine, which separates out as the top phase, is recovered.

615 parts of a stable fluid dye, which dyes paper in an orange hue, are obtained.

EXAMPLE 7

300 parts of water and 46 parts of tributylamine are added to 70 parts of C.I. Direct Blue 86, which is in the form of a moist 34% strength press cake, and the mixture is heated to 60° C. It is then brought to pH 2 by adding dilute sulfuric acid and is stirred for 30 minutes at 100° C., after which it is allowed to cool to 50° C. The aqueous phase is decanted, the organic phase is washed with water, 35 parts of diethanolamine and 250 parts of water are then added, and the mixture is heated at 100° C. for 30 minutes. It is then allowed to cool to room temperature. The fluid dye, which forms the lower phase, is drained off. The tributylamine which separates out as the upper phase is recovered. Residual tributylamine is removed from the dye solution by brief stripping. 352 parts of a fluid dye, which exhibits good solubility and stability, are obtained.

EXAMPLE 8

228 parts of a sulfonation mixture, containing 44 parts of monosulfonated naphthoquinophthalone (C.I. 47,035) are stirred into 910 parts of water, 54 parts of di-2-ethylhexylamine are added, and the batch is stirred vigorously for 15 minutes at 90°-95° C. The phases are allowed to separate and the lower phase, which essentially consists of dilute sulfuric acid, is separated off at about 75°-80° C. The dye phase is then stirred with 500 parts of hot water, the aqueous phase being brought to a pH of about 4-5 by adding about 19 parts of 25% strength ammonia solution. After leaving the phases to separate, the aqueous phase is removed.

20 parts of dimethylethanolamine, 100 parts of water, 40 parts of N-methylpyrrolidone and 40 parts of urea are mixed hot with the dye phase. A concentrated dye solution forms as the lower phase, above which the di-2-ethylhexylamine initially employed separates out as a virtually colorless layer of lower density. The mixture is left to stand and cool and the two liquids are then separated from one another. 261 parts of a storage-stable, concentrated, ready-to-use solution of the dye C.I. 47,035 are obtained. 50 parts of the di-2-ethylhexylamine employed are recovered.

If instead of dimethylethanolamine, an equivalent amount of another alkanolamine, for example diethylethanolamine or methylethanolamine, is employed, a dye solution having similar properties is obtained.

EXAMPLE 9

97 parts of the dye of the formula

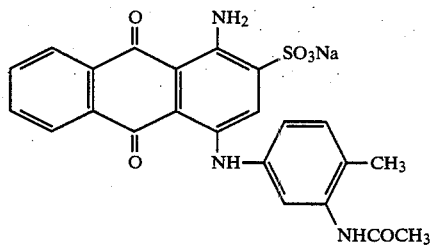

500 parts of water, 25 parts of 50% strength sulfuric acid and 37 parts of tributylamine are briefly heated to 90° C. and cooled to 60° C. The product is filtered off and washed with water. The moist press cake is mixed with 200 parts of water and 55 parts of triisopropanolamine and the mixture is heated to 100° C., in the course of which the tributylamine which separates out distils off.

After removing the tributylamine, the mixture is allowed to cool to room temperature and is then diluted with 150 parts of N-methylpyrrolidone. 510 parts of a fluid formulation of the dye are obtained.

We claim:

1. A process for the preparation of concentrated aqueous fluid formulation of dyes which contain sulfonic acid groups and have a low electrolyte content, wherein an aqueous solution or suspension, which may or may not contain inorganic salts, of the dye containing sulfonic acid groups is, in the absence of solvent
   (a) mixed, at elevated temperature above 50° C., with an amount, approximately stoichiometrically to the sulfo groups of the dye, of a non-emulsifying, water-insoluble amine of a total of 12 to 40 carbon atoms, which forms, with the said dye, a liquid salt which is sufficiently lipophilic that it separates from the aqueous phase,
   (b) the pH is brought to <3 with an acid and the batch is mixed thoroughly,
   (c) the two resulting phases of different density are separated, and
   (d) the phase which consists of the lipophilic ammonium salt of the dye is mixed, with or without prior washing with water, with a water-soluble base whose sulfonate salt is to be prepared, and with water, the resulting phases are mechanically separated, and the salt is left in the aqueous solution or is isolated therefrom.

2. A process as claimed in claim 1, wherein the acid used is an inorganic acid, or formic acid.

3. A process as claimed in claim 1, wherein a secondary or tertiary amine is used as the amine in stage (a).

4. A process as claimed in claim 1, wherein a water-soluble amine is used as the base in stage (d).

5. A process as claimed in claim 1 or 4, wherein an alkanolamine is used as the water-soluble base.

* * * * *